United States Patent
Ray et al.

(10) Patent No.: US 10,969,863 B2
(45) Date of Patent: Apr. 6, 2021

(54) CONFIGURABLE SENSOR ARRAY FOR A MULTI-TARGET ENVIRONMENT

(71) Applicant: International Business Machines Corporation, Armonk, NY (US)

(72) Inventors: Emily A. Ray, Hastings on Hudson, NY (US); Nizar Lethif, Croton-on-Hudson, NY (US); Kuntal Dey, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/406,735

(22) Filed: May 8, 2019

(65) Prior Publication Data
US 2020/0356165 A1    Nov. 12, 2020

(51) Int. Cl.
| | | |
|---|---|---|
| G06F 3/0484 | (2013.01) | |
| G06F 3/16 | (2006.01) | |
| G06F 3/0485 | (2013.01) | |
| G06F 3/01 | (2006.01) | |
| G09G 5/00 | (2006.01) | |
| G06F 3/048 | (2013.01) | |

(52) U.S. Cl.
CPC .............. *G06F 3/013* (2013.01); *G06F 3/017* (2013.01); *G06F 3/048* (2013.01); *G09G 5/003* (2013.01); *G09G 2330/026* (2013.01)

(58) Field of Classification Search
None
See application file for complete search history.

(56) References Cited

U.S. PATENT DOCUMENTS

| | | | | |
|---|---|---|---|---|
| 8,514,262 | B2* | 8/2013 | Ueno | G06K 9/00208 348/14.01 |
| 8,793,620 | B2* | 7/2014 | Stafford | G06F 3/012 715/862 |
| 9,377,852 | B1* | 6/2016 | Shapiro | G06F 3/167 |
| 9,423,870 | B2* | 8/2016 | Teller | G06F 3/013 |
| 9,509,900 | B2 | 11/2016 | Jo | |
| 2006/0082542 | A1* | 4/2006 | Morita | G06F 3/017 345/156 |
| 2012/0295708 | A1* | 11/2012 | Hernandez-Abrego | A63F 13/655 463/36 |

(Continued)

OTHER PUBLICATIONS

Anonymous, GitHub web page, KrigulGaze—https://github.com/Krigu/Gaze/blob/master/GazeBrowser/ui/GazePointer.cpp, Nov. 24, 2019, pp. 1-3.

(Continued)

*Primary Examiner* — Jordany Nunez
(74) *Attorney, Agent, or Firm* — Daniel Morris; Otterstedt, Wallace & Kammer, LLP (57) ABSTRACT

A method of operating a configurable gaze tracking system includes initializing a plurality of sensors by determining positional information of the sensors, wherein the sensors establish a virtual framework, initializing a plurality of target objects by determining positional information of the target objects within the virtual framework, determining a current user using data output by the sensors, determining a gaze of the current user, matching the gaze to one of the target objects in the virtual framework, wherein a target object matched to the gaze is a current target object, and activating the current target object to receive input.

20 Claims, 5 Drawing Sheets

(56) References Cited

U.S. PATENT DOCUMENTS

| | | | |
|---|---|---|---|
| 2013/0083025 A1* | 4/2013 | Gibson | G06F 3/1438 |
| | | | 345/428 |
| 2013/0188032 A1 | 7/2013 | Vertegaal | |
| 2014/0195918 A1* | 7/2014 | Friedlander | G06F 3/0485 |
| | | | 715/727 |
| 2016/0091967 A1* | 3/2016 | Prokofieva | G10L 17/22 |
| | | | 345/156 |
| 2016/0249800 A1 | 9/2016 | Horesh et al. | |
| 2017/0220308 A1 | 8/2017 | Gibson et al. | |
| 2017/0337820 A1* | 11/2017 | Glatfelter | B66F 17/003 |
| 2018/0032129 A1 | 2/2018 | Ahuja et al. | |
| 2018/0074581 A1* | 3/2018 | Melman | G06T 7/80 |
| 2018/0101989 A1 | 4/2018 | Frueh et al. | |
| 2018/0307303 A1* | 10/2018 | Powderly | G06F 1/163 |

OTHER PUBLICATIONS

Anonymous, GazePointer WebCam Eye-Tracker web page,—https://sourceforge.net/projects/gazepointer/, Nov. 24, 2018, pp. 1-8.

Anonymous, Tobii.com, web page—http://www.tobii.com/, Nov. 24, 2018, pp. 1-3.

Anonymous, S.Oliver Associates, web page http://www.s-oliver-associates.com/d7-desk-top-eye-tracking, Nov. 24, 2018, pp. 1-2.

\* cited by examiner

CONFIGURABLE SENSOR ARRAY FOR A MULTI-TARGET ENVIRONMENT

BACKGROUND

The present disclosure relates generally to sensor arrays, and more particularly to a system and method for a reconfigurable sensor array.

Conventional gaze tracking technology can be used to move a cursor or change an active window. These systems are tied, through hardware and/or software, to a single monitor. When a user turns their head, such that their eyes are no longer visible to a camera of the system, a gaze tracking capability is lost.

It is increasingly common to work with multiple displays, driven by one or more computers. These work environments typically involve a number of applications open simultaneously and displayed in different windows.

Immersive workspaces typically have many displays that can be oriented in different directions. In all of these situations a user will typically shift their focus between different points, and quickly repositioning their gaze to different displays, windows, applications, tabs, etc., while using a pointing device, such as a mouse or touch screen to activate different elements in the workspace. In at least some cases, the pointing device becomes a bottleneck in terms of speed and efficiency. Moreover, gaze tracking systems, limited to single monitor environments, are not applicable to this type of workspace.

BRIEF SUMMARY

According to an embodiment of the present invention, a method of operating a configurable gaze tracking system includes initializing a plurality of sensors by determining positional information of the sensors, wherein the sensors establish a virtual framework, initializing a plurality of target objects by determining positional information of the target objects within the virtual framework, determining a current user using data output by the sensors, determining a gaze of the current user, matching the gaze to one of the target objects in the virtual framework, wherein a target object matched to the gaze is a current target object, and activating the current target object to receive input.

According to an embodiment of the present invention, a system comprises a processor, a plurality of sensors, wherein a combined sensor capability of the sensors establishes a virtual framework, and wherein each of the sensors is configured to report positional information to the processor, and a plurality of target objects disposed within the virtual framework, wherein the processor is configured to determine a current user using data output by the sensors, determine a gaze of the current user, match the gaze to one of the target objects in the virtual framework, wherein a target object matched to the gaze is a current target object, and activate the current target object to receive input.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:
  reconfigurable sensor arrays;
  gaze detection over multiple interfaces; and
  attention activation of windows in the context of a multi-interface system.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

Embodiments of the present invention are directed to a gaze tracking system and method capable of functioning in an environment comprising a plurality of displays. According to some embodiments, a cone of visibility of a gaze tracking system is improved, and in at least one embodiment, eliminated.

According to one or more exemplary embodiments of the present invention, a system 100 (see FIG. 1) comprises a processor 101, a plurality of sensors 102, 103, including a plurality of images capture devices (i.e., 102), and a plurality of target objects, e.g., 104, 105 (for example, a display, user interface, input device, etc.). According to at least one embodiment of the present invention, the system is configured to detect positional information of the sensors and target objects, including relative positional information between the sensors and target objects. For example, the processor 101 can receive positional information from the sensors and the target objects and detect positional information therebetween. According to some embodiments, the processor 101 detects an object of interest, e.g., display 105, among the target objects, for example, by detecting a gaze 106 of a user 107. Herein, the object of interest can also be referred to as the current target object.

Figure 1:
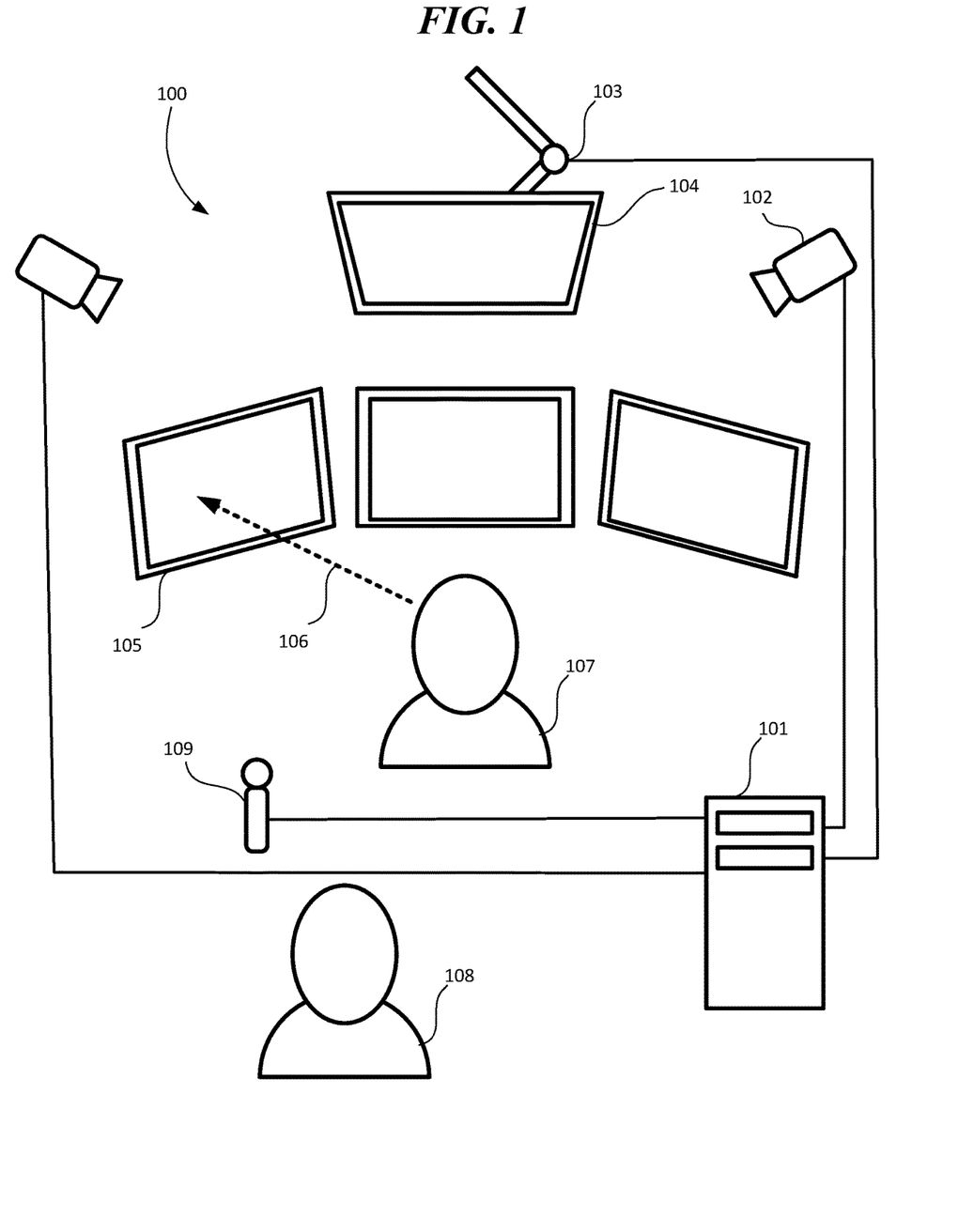
FIG. 1 depicts a (re)configurable gaze tracking system for a multi-display environment according to an exemplary embodiment of the present invention.

According to at least one embodiment of the present invention, the system 100 tracks the gaze 106 of the user 107 to detect the object of interest, e.g., display 105, from among the target objects, causing the object of interest to be activated. According to some embodiments, the gaze 106 of the user 107 is detected using one or more of head tracking and eye tracking. For example, a gaze detector module 302 (see FIG. 3), can include a head pose detection component, a weight assignment component, an eye center localization component, a nostril position detection component, and an eye corner position detection component. As further detailed herein, and based on gaze information (e.g., a directional vector) arising from a current user, the eye center localization component detects eye center localization (for example, using one or more inward gradient vectors) data for the current user, the nostril position detection component detects a nostril position of the current user, and the eye corner position detection component detects an eye corner position, with respect to caruncle, of one or more of the current user's eyes. In one or more embodiments of the invention, the components of the gaze detector module can make the noted detections of the eye and nostril positions by implementing one or more detection algorithms in conjunction with a camera of the sensors. The eye corner, for example, can act as a facial reference point in a gaze tracking system.

Figure 3:
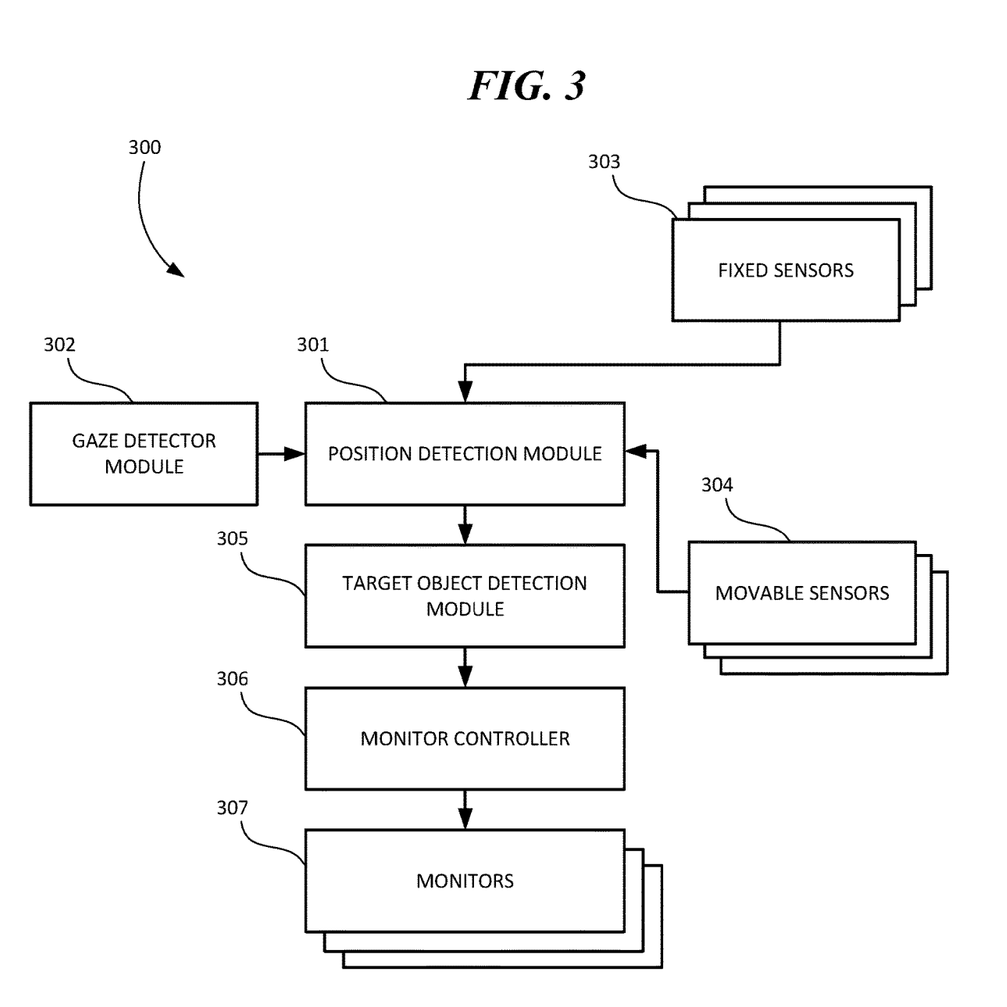
FIG. 3 is a diagram of a system embodying an improved gaze tracking method (re)configurable for a multi-display environment, according to an exemplary embodiment of the present invention.

The gaze detector module 302 identifies and/or determines a facial reference point of the current user using a combination of the position of eyes and nostrils. Additionally, one or more exemplary embodiments of the invention can also include identifying and/or determining a facial reference point of the current user using a combination of the position of eyes and nostrils with respect to varying head poses and/or positions of the current user.

Determining a specific combination of nostril and eye reference points can be carried out by assigning a distinct weight to each of (i) the detected eye center localization data for the current user, (ii) the detected nostril position of the current user, and (iii) the detected eye corner position of the current user based on the current head pose of the current user. Head poses can include indications and/or measurements pertaining to an upward inclination of the head, a downward inclination of the head, a leftward inclination of the head, and/or a rightward inclination of the head. Further, according to at least one embodiment of the invention, the detection of a head pose of the current user and dynamically updating reference point weights applied to (i) the detected eye center localization data for the current user, (ii) the detected nostril position of the current user, and (iii) the detected eye corner position of the current user based upon the detected head pose. Such an embodiment can also include significantly nullifying against inadvertent head movements of the current user using a head pose detection algorithm.

When tracking the gaze of the current user, according to at least one embodiment of the present invention, angle changes in the sensor(s) (e.g., camera) can be compensated for based on the changes in z-direction, using one or more three dimensional (3D) localization algorithms. By way of example, the head pose of the current user is detected, which happens to change in terms of angles if the head of the current user turns in different directions. This detection can also be combined with the detected eye center to determine the point at which the current user is looking. Additionally, in one or more embodiments of the invention, a proximity sensor can be used to track a distance of the current user's face from the sensor.

According to at least one embodiment of the present invention, one or more of the sensors 102, 103, are movable, with customizable attachment points. For example, a sensor 103 connected to a supporting arm of a display 104 registers the position and orientation of the display 104. According to some embodiments, the sensors update the positional information, providing updated positional information to the processor 101. According to at least one embodiment, the positional information includes orientation information. According to some embodiments, the sensors include a finite set of dissimilar monitors, computers, cameras, radio-frequency identification (RFID) tags, Global Positioning System (GPS) locators, gaze tracking reflection cameras used in conjunction with pupil center corneal reflection (PCCR) methods with near-infrared light directed towards the current user, flexible body sensors, etc.

According to one or more exemplary embodiments of the present invention, a sensor is a polymer-based adhesive tracker configured to attach to a user's neck, below the chin, and detect muscle activation and infers head movement as well as reads out a reference translational position relative to other cameras and sensors in the device array. According to one or more exemplary embodiments of the present invention, a sensor is a positional locator including two or more elements configured to determine a head-pointing vector (e.g., described by x, y and z coordinate points on a projected plane) and an overall position of the user.

Exemplary camera type sensors are equipped with neuromorphic computing capabilities and configured to actively process images to detect target objects (e.g., display screens) and people in the environment. According to some embodiments, the camera type sensors detect humans' head position and eyes, with resolution to determine a gaze angle (when possible).

Exemplary microphone type sensors can be disposed around a virtual framework and are configured to monitor sounds for conversation, content of speech, and differences in speakers. In one exemplary implementation, a calibration period can be used to identify the speakers, followed by a continual classification of which speaker is current active, and reinforced with information from camera sensors identifying the user (e.g., speaking at the correct time stamps).

According to at least one embodiment, removable reflection-based gaze tracking sensors are attached to one or more of the target objects.

According to one or more exemplary embodiments of the present invention, visible wavelength cameras include an integrated positional monitoring system, gaze trackers are equipped with an RFID sensor that determines position from a homing beacon in the virtual framework, and other sensors have some combination of Bluetooth, RFID, GPS, etc., to monitor positional information. According to at least one embodiment, the sensors are connected with a system that determines and tracks their position relative to one another.

According to one or more embodiments of the present invention, the target objects are movable, and a set of target objects is configurable, enabling target objects to be added to, removed from, and replaced in the set.

According to some embodiments, a user can be dynamically changed. For example, the processor 101 can recognize a first user 107, the currently recognized user, and replace the currently recognized user with a second user 108 based on a voice command issued to the processor 101, based on a change of users' 107, 108 positions within a defined virtual framework, etc. According to one or more embodiments of the present invention, the recognition of users uses one or more of a facial recognition and voice recognition. Information about the identities of the users can be further used to track the users' positions in the virtual framework.

According to at least one embodiment of the present invention, the sensors define the virtual framework as an area in which target objects and users can be detected. According to one or more exemplary embodiments of the present invention, as potential users move around the virtual framework, the sensor array infers their positions and gaze from its inputs.

According to exemplary embodiments of the present invention, an array of sensors, 102, 103, etc., can include positional, orientational, rotational sensors, cameras configured to detect eye movement, input devices, etc. The array of sensors is used in combination with a plurality of target objects, such as a display. The sensors communicate with the processor. According to some embodiments, the sensors communicate with one another. According to at least one embodiment, the sensors communicate with an external-to-the array system to track their relative positions and fields of detection.

Exemplary connective technologies include RFID, Bluetooth, Wi-Fi, GPS, signal ranging, etc. According to one or more embodiments of the present invention, the sensors track one or more users to determine continuous position(s) of the gaze(s) and activate appropriate target objects that intersect with it the gaze(s). According to some embodiments, one or more of the sensors monitor the user(s) within the virtual framework.

According to one or more embodiments of the present invention, the processor 101 tracks one or more of a user's gaze, a user's gaze relative to the user, a user's gaze relative to other sensors, a user's gaze relative to a subset of target objects, a user's gaze relative to all interfaces to the processor, etc. According to one or more embodiments of the present invention, the processor 101 tracks position and orientation of each sensor, position and orientation of one or more target objects relative to other target objects in the array, position and orientation of target objects relative to a subset of the array.

According to some embodiments, a sensor is disposed on a physical target object using an attachment mechanism (e.g., a replaceable adhesive, suction cup, etc.) that allows the sensor to be moved. According to at least one embodiments, the sensor has a broadcast mode that communicates with the processor, target objects, and/or other sensors to determine a relative position. According to an embodiment of the present invention, sensors placed independently of target objects broadcast their position, and include a mechanism for identifying the position of an interface, a user, etc. For example, a camera, radar, reflectometer, etc. broadcasts its position to the processor. If a camera source is used to detect a state, position, and orientation of an interface (e.g., a displayed window), a machine vision algorithm is implemented (in the camera and or processor) in conjunction with state broadcasting of the camera.

According to some embodiments, the user is supplied with a sensor that is worn, such as a minimally-invasive sticker embedded with an RFID chip or a GPS chip. The sensor can include a GPS chip, a gyroscopic chip, etc., disposed on a polymer substrate. The sensor can be configured to detect positional information (e.g., detecting of a position of the user's neck, engagement of rotational muscles, etc.), detect a line of sight, etc.

According to at least one embodiment, when the user has moved out of an area of detection of a given sensor, the sensor enters a standby state, pausing an active monitoring state, an actively passes its responsibility to a predicted neighbor sensor. According to one or more embodiments, each sensor constantly monitors the virtual framework regardless of a current action, for example, in a case where the sensors detect a portion of one or more interfaces and/or the user gaze. According to at least one embodiment, the sensors continuously (or periodically) update their state. According to at least one embodiment, each sensor has a unique identifier known to the processor. According to some embodiments, the array uses embedded or external computation capabilities to detect a current configuration of all elements (e.g., sensors, target objects, input devices, etc.) and the user(s) gaze at any given time, even in a case where less than all of the sensors have this access to the current configuration information.

According to at least one embodiment, the system 100 includes one or more voice sensors 109, which are used to identify situations of collaborative work (e.g., distinguish between users), and to detect a main user among the users (e.g., the user's whose gaze is to be followed). Moreover, according to at least one embodiment of the present invention, sound can be used to provide additional tracking information about the users in the virtual framework. According to some embodiments, a method of determining the main user includes determining an amount of speech input attributed to each user, where a user who speaks the most during a given time bin is labeled as the main user. According to another embodiment, the main user can be determined as a current speaker, based on voice identification of a super user, a command word to shift user status, etc.

Figure 2:
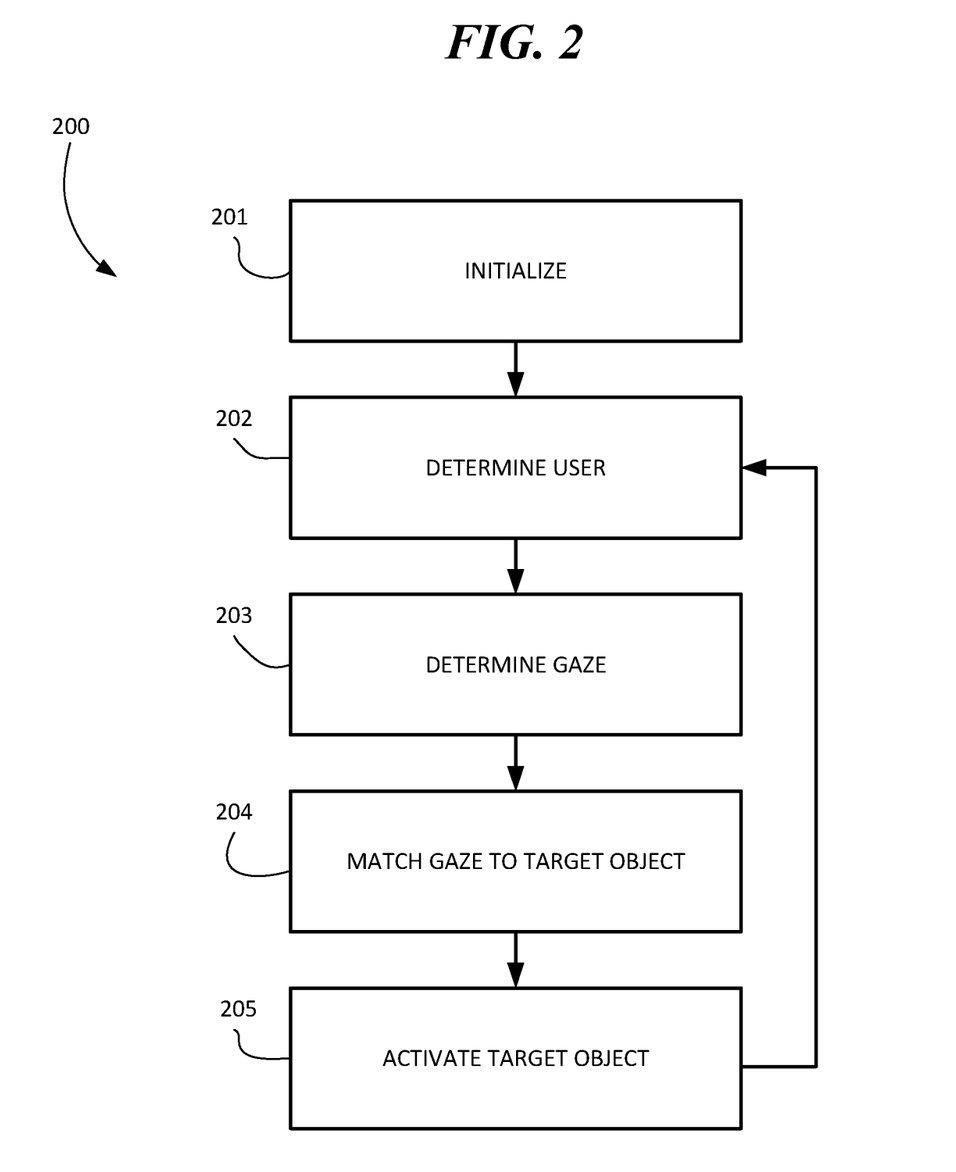
FIG. 2 depicts a method of operating a (re)configurable gaze tracking system according to an exemplary embodiment of the present invention.

Referring to FIG. 2, in a method of operating a (re) configurable gaze tracking system 200 according to an exemplary embodiment of the present invention, the system is initialized at 201. The system is tasked with determining a current user at block 202. At block 203, the system determines the gaze of the current user, and matches the gaze to a target object in the virtual framework 204. The target object that has the user's gaze is activated to receive input 205.

The system initialization at block 201 can include the determination of the relative positional information of the array of sensors and/or target objects (e.g., displays, user interfaces, input devices, etc.). According to some embodiments, the initialization 201 determines a position of any of the movable sensors repositioned since a previous initialization (e.g., since a previous meeting, conference, collaboration, etc.). According to at least one embodiment, the initialization determines whether a sensor is no longer available and/or whether one or new sensors have been added.

According to one or more embodiments of the present invention, the determination of the current user 202 is based on one or more of audio input received from the environment (e.g., a current active participant among a group of potential users), explicit user commands, video type input received from one or more cameras (e.g., identifying the current active participant), etc.

According to some embodiments of the present invention, the determination of gaze 203 can be limited to the current user, or an be continuously determined for one or more potential users (e.g., the current user and a immediately preceding user) in the virtual framework. Accordingly, the system can efficiently switch between users, such as when the current user is changed. Similarly, the system can limit the gaze matching 204 to the current user, reducing processing overhead, or continuously determine the gaze for one or more potential users in the virtual framework.

According to some embodiments of the present invention, the gaze matching 204 is performed by the system using a camera (e.g., sensor 102) and known computer vision techniques for object identification from images (e.g., video images). The system identifies target objects in the images from the camera (e.g., using IBM's PowerAI Vision and Video Data Platform) and the locations of the target objects in the 3D virtual framework (e.g., using the OpenCV (Open Source Computer Vision Library) tracking application program interface). For localization of the target objects, the sensors 303-304 (see FIG. 3) of the system can further include an optical depth sensor or the like.

According to at least one embodiment of the present invention, in a case where an object of interest is a computer screen, the method can identify a further object of interest on the screen (e.g., a window interface or GUI element of interest to the current user as determined by eye gaze).

According to some embodiments of the present invention, in perform the gaze matching 204, the system (e.g., 400 in FIG. 4) determines an eye gaze vector by estimating 3D coordinates of the eye corners and the pupil with respect to the camera frame, calculates a eye-ball center coordinate based on the coordinates of the eye corners, obtains a parametric equation of the gaze vector passing through the pupil and the eye ball center, and determines the intersection of the plane and the gaze vector to obtain a point of gaze on the screen. According to one or more embodiments of the present invention, in a case of determining an object of interest on the screen of a display, the method calculates a plane of the screen (e.g., from the images and/or from an accelerometer reading in the display) including roll, yaw and pitch angles prior to determining the intersection of the plane and the gaze vector.

According to some embodiments, the eye gaze vector is projected along a z-axis (assuming the face of the current user is on an xy plane). According to at least one embodiment of the present invention, the system further elongates the eye gaze vector along the z-axis, and determines the intersection with a nearest target object. According to at least one embodiment of the present invention, the system determines all intersections with target objects in the virtual framework and finds a target object having a shortest distance from the current user's gaze (e.g., a shortest distance from the gaze vector), where the target object is determined to be the object of interest.

According to at least one embodiment of the present invention, the activation of the target object 205 (i.e., the object of interest 105) enables the target object to receive input seamlessly. According to some embodiments, the activation of the target object may include issuing a control signal to the target object switching the target object from a low power mode to a normal mode, reducing overall power consumption of the system by maintaining one or more other target objects in the low power mode. According one or more embodiments of the present invention, in a case where the target object is a display, the activation of the target object automatically moves a cursor (e.g., which can be controlled by a pointing device) to the display for manipulating one or more displayed elements (of a graphical user interface (GUI)).

FIG. 3 is a diagram of a system 300 embodying an improved gaze tracking method (re)configurable for a multi-display environment, according to an exemplary embodiment of the present invention. In view of FIG. 3, it should be noted that any of the methods described herein can include an additional step of providing a system 300 comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a position detection module 301 configured to receive positional information output by one or more of the movable sensors 304 and/or fixed sensors 303, and receive data output by a gaze detector module 302. The position detection module 301 can be further configured to determine the position of one or more of the moveable sensors 304 and/or fixed sensors 303. The gaze detection module 302 is configured to output a position of a main user and gaze information about the main user's gaze, e.g., vector information. The modules further include a target object detection module 305 receiving an output of the position detection module 301 and determining a target object (not shown) based on the user's gaze and the positional information of the main user. The modules further include a monitor controller 306, which outputs control signals (e.g., by Ethernet, Bluetooth, Wi-Fi, etc.) to one or more target objects. For example, the monitor controller can switch a focus of a computer system, enabling the main user to control a current target object (e.g., a monitor 307) having the focus. Here, the focus refers to a current target object, interface, etc., that can be manipulated by a user, for example, by associating one or more input devices with the current target object having the focus. The method steps can then be carried out using the distinct software modules of the system, as described above, executing on one or more hardware processors.

Figure 4:
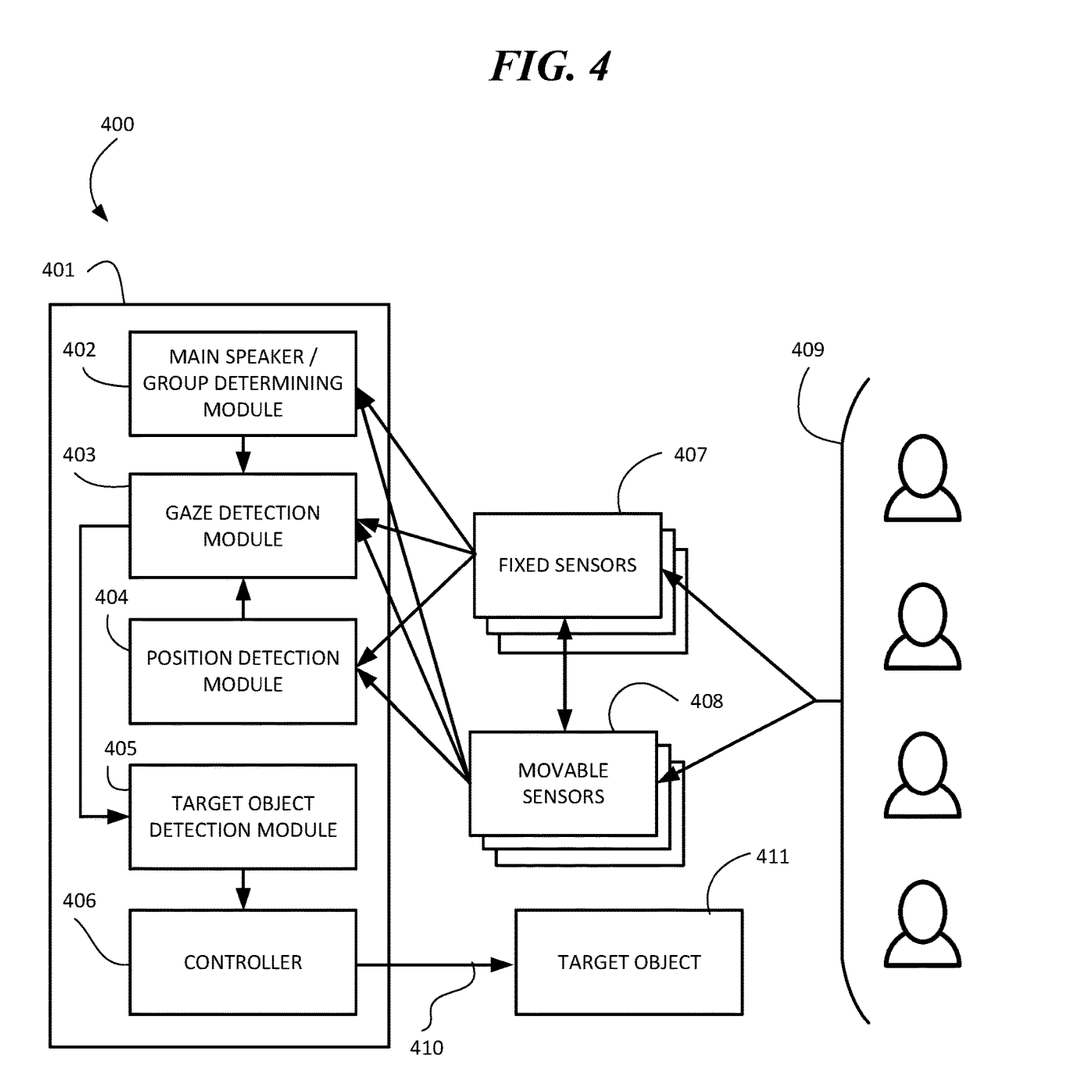
FIG. 4 is a diagram of a system embodying an improved gaze tracking method (re)configurable for a multi-display environment, according to an exemplary embodiment of the present invention.

FIG. 4 is a diagram of a system 400 embodying an improved gaze tracking method (re)configurable for a multi-display environment, according to an exemplary embodiment of the present invention. In view of FIG. 4, it should be noted that any of the methods described herein can include an additional step of providing a system 400 comprising distinct software modules embodied on one or more tangible computer readable storage media 401. All the modules (or any subset thereof) can be on the same medium, or each can be on a different medium, for example. The modules can include any or all of the components shown in the figures. In a non-limiting example, the modules include a main speaker/group determining module 402, a gaze detection module 403, a position detection module 404, a target object detection module 405, and a controller 406. According to at least one exemplary embodiment of the present invention, the main speaker detection module 402 monitors the speech of users 409 (detected by a microphone among the fixed sensors 407 and the movable sensors 408) and determines a main user to be associated with the control of the system 400. The gaze detection module 403 includes a computer vision system to detect the gaze of the main user from video images of the main user. The video images can be provided by one or more cameras among the fixed sensors 407 and the movable sensors 408. According to one or more embodiments of the present invention, the position detection module 404 receives positional information from one or more of the fixed sensors 407 and the movable sensors 408 and/or determines positional information for one or more of the fixed sensors 407 and the movable sensors 408 (e.g., based on information determined from outputs of the sensors, using user supplied information, etc.). According to some embodiment, the position detection module 404 detects a position of the main user using video data received from one or more cameras and/or microphones (e.g., by blind source separation techniques) among the fixed sensors 407 and the movable sensors 408. The target object detection module 405 receives an output of the gaze detection module 403 and determines a target object (not shown) based on the user's gaze and the positional information of the main user. The controller 406 outputs control signals 410 to one or more target objects 411 according to inputs of the main user. For example, the main user, identified earlier, is given control over the system 400, and appropriate target objects are activated according to input of the main user (e.g., the user's gaze).

Recapitulation:

According to one or more embodiments of the present invention, a method of operating a configurable gaze tracking system comprises initializing a plurality of sensors by determining positional information of the sensors, wherein the sensors establish a virtual framework (201), initializing a plurality of target objects by determining positional information of the target objects within the virtual framework (201), determining a current user using data output by the sensors (202), determining a gaze of the current user (203), matching the gaze to one of the target objects in the virtual framework, wherein a target object matched to the gaze is a current target object (204), and activating the current target object to receive input (205).

According to one or more embodiments of the present invention, a system comprises a processor (101), a plurality of sensors (e.g., 102, 109), wherein a combined sensor capability of the sensors establishes a virtual framework, and wherein each of the sensors is configured to report positional information to the processor, and a plurality of target objects disposed within the virtual framework (e.g., 104, 105), wherein the processor is configured to determine a current user using data output by the sensors, determine a gaze of the current user, match the gaze to one of the target objects in the virtual framework, wherein a target object matched to the gaze is a current target object, and activate the current target object to receive input.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system implementing an improved gaze tracking method (re)configurable for a multi-display environment. Further, a computer program product can include a tangible computer-readable recordable storage medium with code adapted to be executed to carry out one or more method steps described herein, including the provision of the system with the distinct software modules.

Figure 5:
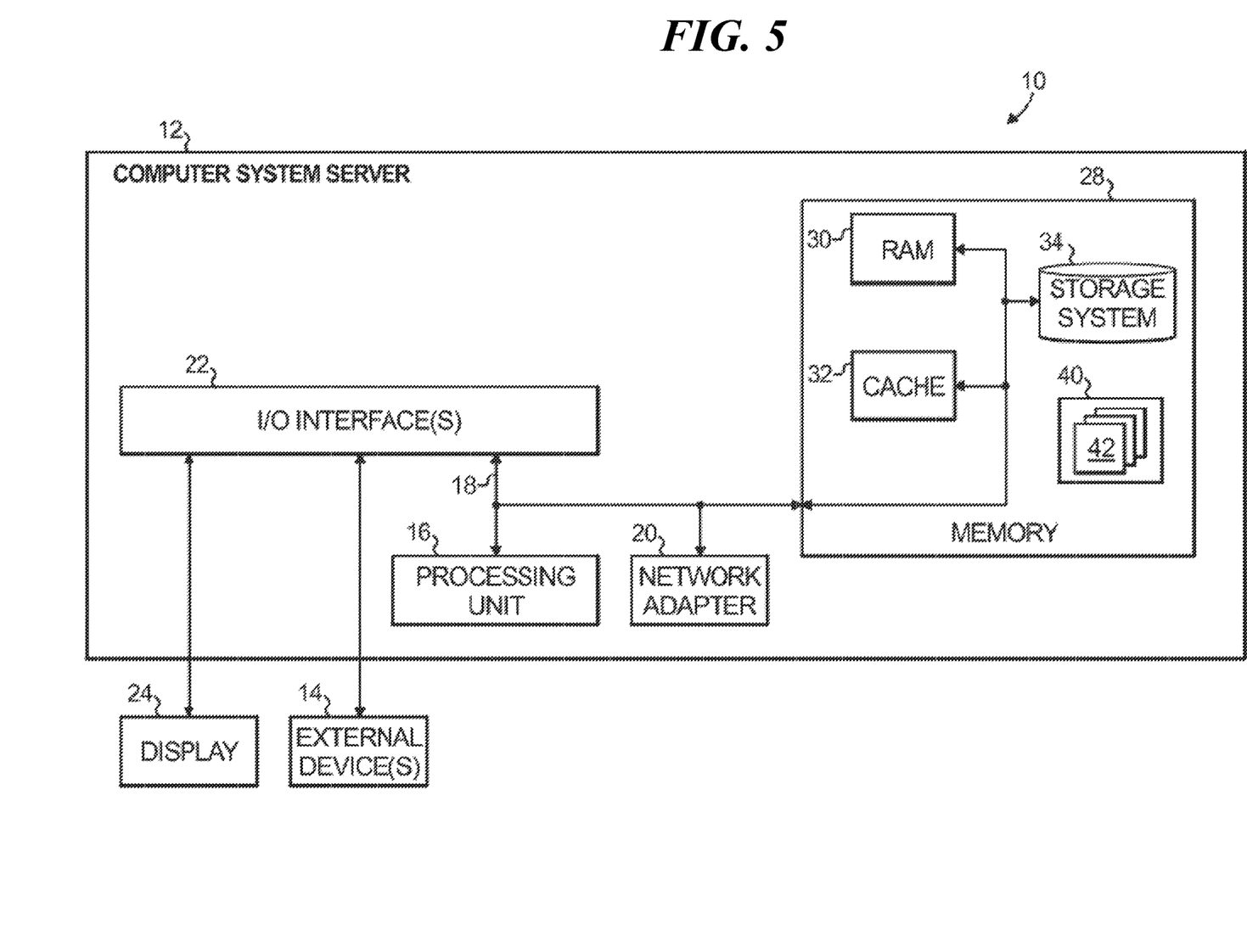
FIG. 5 is a block diagram depicting an exemplary computer system embodying an improved gaze tracking method (re)configurable for a multi-display environment, according to an exemplary embodiment of the present invention.

One or more embodiments of the invention, or elements thereof, can be implemented in the form of an apparatus including a memory and at least one processor that is coupled to the memory and operative to perform exemplary method steps. FIG. 5 depicts a computer system that may be useful in implementing one or more aspects and/or elements of the invention, also representative of a cloud computing node according to an embodiment of the present invention. Referring now to FIG. 5, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 5, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 5) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of operating a configurable gaze tracking system comprises:
    initializing a plurality of sensors by determining positional information of the sensors, wherein the sensors establish a virtual framework;
    initializing a plurality of target screens by determining positional information of the target screens within the virtual framework, wherein determining the position information includes determining a plane of each of the target screens;
    determining a current user using data output by the sensors, wherein determining the current user comprising detecting an amount of speech attributed to each of a plurality of users and determining the current user to be the user attributed the most speech within a given time bin;
    determining a gaze of the current user;
    determining an intersection of the gaze to the plane of one of the target screens in the virtual framework, wherein a target screen matched to the gaze according to the intersection is a current target screen; and
    activating the current target screen to receive input.

2. The method of claim 1, wherein activating the current target screen comprises powering on the target screen.

3. The method of claim 1, wherein activating the current target object screen comprises giving focus to a computer program application, wherein the intersection with the current target screen is further determined as an interaction with a window of the computer program application displayed in a graphical user interface displayed by a monitor, wherein giving focus to the computer program application further comprising removing focus from a prior target screen.

4. The method of claim 1, wherein determining the gaze of the current user comprises:
    receiving a video output of the sensors;
    detecting the current user in the video output, including detecting a position of the current user within the virtual framework; and
    detecting the gaze of the current user, wherein the gaze is a directional vector emanating from the position of the current user.

5. The method of claim 1, further comprising detecting a position of the current user.

6. The method of claim 1, further comprising detecting a change in the current user, wherein the change comprises changing the current user from a first user to a second user.

7. The method of claim 6, wherein the change is performed upon receiving at least one of an audio input and a command received from an input device.

8. A system comprising:
    a processor;
    a plurality of sensors, wherein a combined sensor capability of the sensors establishes a virtual framework, and wherein each of the sensors is configured to report positional information to the processor; and
    a plurality of target screens disposed within the virtual framework,
    wherein the processor is configured to determine a current user using data output by the sensors including detecting an amount of speech attributed to each of a plurality of users and determining the current user to be the user attributed the most speech within a given time bin, determine a gaze of the current user, match the gaze to one of the target screens in the virtual framework, wherein a target screen matched to the gaze is a current target screen, and activate the current target screen to receive input.

9. The system of claim 8, wherein at least one of the sensors is a fixed position.

10. The system of claim 8, wherein at least one of the sensors is a movable sensors, wherein the movable sensor periodically reports position information to the processor.

11. The system of claim 8, wherein the current target screen is configured to receive a control signal from the processor.

12. The system of claim 8, wherein the current target screen is in signal communication with the processor by at least one of wired and a wireless network.

13. A non-transitory computer readable storage medium comprising computer executable instructions which when executed by a computer cause the computer to perform a method of operating a configurable gaze tracking system, the method comprising:
    initializing a plurality of sensors by determining positional information of the sensors, wherein the sensors establish a virtual framework;
    initializing a plurality of target screens by determining positional information of the target screens within the virtual framework;
    determining a current user using data output by the sensors, wherein determining the current user comprises detecting a voice of a super user by voice identification and granting the super user control of the configurable gaze tracking system, wherein the current user is the super user;
    determining a gaze of the current user;
    matching the gaze to one of the target screens in the virtual framework, wherein a target object matched to the gaze is a current target object; and
    activating the current target object to receive input.

14. The computer readable storage medium of claim 13, wherein activating the current target screen comprises powering on the target screen.

15. The computer readable storage medium of claim 13, wherein activating the current target screen comprises giving focus to a computer program application, wherein the current target screen is window of the computer program application displayed in a graphical user interface displayed by a monitor, wherein giving focus to the computer program application further comprising removing focus from a prior target screen.

16. The computer readable storage medium of claim 13, wherein determining the gaze of the current user comprises:

receiving a video output of the sensors;

detecting the current user in the video output, including detecting a position of the current user within the virtual framework; and detecting the gaze of the current user, wherein the gaze is a directional vector emanating from the position of the current user.

17. The computer readable storage medium of claim 13, further comprising detecting a position of the current user.

18. The computer readable storage medium of claim 13, further comprising detecting a change in the current user, wherein the change comprises changing the current user from a first user to a second user, wherein the change is performed upon receiving at least one of an audio input and a command received from an input device and further comprises granting control of the configurable gaze tracking system to the second user.

19. The computer readable storage medium of claim 13, further comprising:

determining a plurality of intersections with the target screens in the virtual framework; and finding a target screen having a shortest distance from the current user's gaze, where the target object having the shortest distance from the current user's gaze is the target object matched to the gaze.

20. The method of claim 1, further comprising:

determining a plurality of intersections with the target screens in the virtual framework; and finding a target screen having a shortest distance from the current user's gaze, where the target object having the shortest distance from the current user's gaze is the target object matched to the gaze.

* * * * *